(12) United States Patent
Crenshaw

(10) Patent No.: US 11,873,644 B2
(45) Date of Patent: Jan. 16, 2024

(54) MODULAR WALL UNITS HAVING FRONT PANELS WITH AESTHETIC DESIGNS COVERING A WINDOW FOR MODULAR WALL SYSTEMS

(71) Applicant: MFPHD, LLC, Lorena, TX (US)

(72) Inventor: Thomas Crenshaw, Lorena, TX (US)

(73) Assignee: MfPHD, LLC, Lorena, TX (US)

( * ) Notice: Subject to any disclaimer, the term of this patent is extended or adjusted under 35 U.S.C. 154(b) by 136 days.

(21) Appl. No.: 17/463,735

(22) Filed: Sep. 1, 2021

(65) Prior Publication Data

US 2023/0067586 A1    Mar. 2, 2023

(51) Int. Cl.
| E04C 2/38 | (2006.01) |
| --- | --- |
| B32B 3/08 | (2006.01) |
| B32B 5/02 | (2006.01) |
| B32B 7/12 | (2006.01) |
| B32B 27/06 | (2006.01) |

(Continued)

(52) U.S. Cl.
CPC ............ *E04C 2/384* (2013.01); *B32B 3/08* (2013.01); *B32B 5/02* (2013.01); *B32B 7/12* (2013.01); *B32B 27/06* (2013.01); *B32B 27/30* (2013.01); *E04C 2/28* (2013.01); *E04C 2/46* (2013.01); *E04F 13/0801* (2013.01); *E04F 13/26* (2013.01); *B32B 2419/04* (2013.01);
(Continued)

(58) Field of Classification Search
CPC ... E04C 2/384; E04C 2/28; E04C 2/46; E04C 2002/001; E04C 2002/005; E04C 2/292; E04C 2/24; B32B 3/08; B32B 5/02; B32B 7/12; B32B 27/06; B32B 27/30; B32B 2419/04; B32B 2451/00; E04B 2/7457; E04B 2002/7498; E04F 13/18; E04F 13/0891; E04F 13/0844; E04F 13/16; E04F 13/0866; E04F 13/26; E04F 13/0801

See application file for complete search history.

(56) References Cited

U.S. PATENT DOCUMENTS

| 1,918,228 | A |   | 7/1933 | Spencer |
| 2,851,134 | A | * | 9/1958 | Robinson, Jr. .......... E04F 13/12 |
|           |   |   |        | 52/506.1 |

(Continued)

FOREIGN PATENT DOCUMENTS

| CN | 102383507 A | 3/2012 |
| CN | 110439204 A | 11/2019 |

(Continued)

OTHER PUBLICATIONS

International Search Report and Written Opinion dated Jun. 1, 2022 for Application No. PCT/US2021/055564.

(Continued)

*Primary Examiner* — Andrew J Triggs
(74) *Attorney, Agent, or Firm* — Patterson + Sheridan, LLP

(57) ABSTRACT

Aspects of the present disclosure relate to modular wall systems, modular wall units, and methods of installing modular wall systems for indoor environments such as medical treatment environments. In one implementation, a first outer panel and a second outer panel are spaced apart from each other to form a window, and a front panel is attached to front surfaces of the first and second outer panels. The front panel is formed of a polymeric material or a composite material, and the front panel includes an aesthetic design thereon.

23 Claims, 11 Drawing Sheets

(51) Int. Cl.
  *B32B 27/30* (2006.01)
  *E04C 2/28* (2006.01)
  *E04B 2/00* (2006.01)
  *E04F 13/08* (2006.01)
  *E04F 13/26* (2006.01)
  *E04C 2/00* (2006.01)

(52) U.S. Cl.
  CPC ..... *B32B 2451/00* (2013.01); *E04C 2002/001* (2013.01); *E04C 2002/005* (2013.01)

(56) References Cited

U.S. PATENT DOCUMENTS

| | | |
|---|---|---|
| 3,906,696 A | 9/1975 | Poter et al. |
| 3,989,397 A | 11/1976 | Baker |
| 4,122,203 A | 10/1978 | Stahl |
| 4,477,201 A | 10/1984 | Yoshiyuji |
| 5,297,370 A | 3/1994 | Greenstreet et al. |
| 5,592,786 A | 1/1997 | Kamm |
| 5,816,003 A | 10/1998 | Larsson et al. |
| 6,070,377 A | 6/2000 | Guevara Guzman |
| 6,421,972 B1* | 7/2002 | Dalphond .............. E04C 2/384 52/407.3 |
| 6,792,727 B2 | 9/2004 | Krieger |
| 7,303,358 B1 | 12/2007 | Fuller |
| 7,805,899 B2 | 10/2010 | Montgomery |
| 8,033,066 B2 | 10/2011 | Griffiths |
| 8,063,116 B2 | 11/2011 | Trogolo et al. |
| 8,245,467 B2 | 8/2012 | Lewis et al. |
| 8,484,931 B2 | 7/2013 | Gleeson et al. |
| 8,596,000 B2 | 12/2013 | Mitchell et al. |
| 8,833,025 B2* | 9/2014 | Krause .................. E04B 1/7629 52/489.1 |
| 9,003,737 B2 | 4/2015 | Solomon et al. |
| 9,010,068 B2 | 4/2015 | Sullivan et al. |
| 9,151,053 B2* | 10/2015 | Stephens, Jr. ......... E04B 1/7608 |
| 9,169,641 B2 | 10/2015 | Wickstrom |
| 9,499,978 B2 | 11/2016 | Glancy |
| 9,523,205 B2* | 12/2016 | Vigouroux .............. E04F 13/12 |
| D784,560 S | 4/2017 | D'Anglade |
| 9,635,941 B2 | 5/2017 | Bates et al. |
| 9,874,026 B2 | 1/2018 | Bilge |
| 10,011,997 B1 | 7/2018 | Bilge |
| 10,072,411 B1 | 9/2018 | Moran et al. |
| 10,267,045 B1 | 4/2019 | Knight, Jr. et al. |
| 10,316,525 B1 | 6/2019 | Bilge |
| 10,370,858 B2* | 8/2019 | Krause .................. E04F 13/007 |
| 10,400,456 B2* | 9/2019 | Krause .................. E04B 1/7629 |
| 10,858,167 B2 | 12/2020 | D'Anglade |
| 11,098,477 B2 | 8/2021 | Crenshaw |
| 2004/0211127 A1 | 10/2004 | Wiechecki et al. |
| 2006/0000176 A1 | 1/2006 | Taylor |
| 2007/0227089 A1 | 10/2007 | Lewis et al. |
| 2010/0095624 A1 | 4/2010 | Lewis et al. |
| 2012/0304568 A1 | 12/2012 | Aboukhalil |
| 2013/0326987 A1 | 12/2013 | Krieger |
| 2014/0259970 A1 | 9/2014 | Shapiro |
| 2015/0020468 A1 | 1/2015 | Wickstrom |
| 2016/0273217 A1 | 9/2016 | Huntzinger et al. |
| 2018/0016838 A1* | 1/2018 | Haba .................. E04C 2/284 |
| 2018/0274231 A1 | 9/2018 | Epstein et al. |
| 2020/0149270 A1 | 5/2020 | Crenshaw |
| 2021/0222439 A1* | 7/2021 | Day .................. E04F 13/083 |
| 2021/0372119 A1 | 12/2021 | Crenshaw |
| 2021/0396020 A1 | 12/2021 | Crenshaw |
| 2021/0396021 A1 | 12/2021 | Crenshaw |
| 2021/0396022 A1 | 12/2021 | Crenshaw |
| 2023/0067586 A1* | 3/2023 | Crenshaw ............ E04F 13/0844 |

FOREIGN PATENT DOCUMENTS

| | | |
|---|---|---|
| CN | 111101673 A | 5/2020 |
| DE | 2650886 A1 | 5/1977 |
| KR | 20100021852 A | 2/2010 |
| RU | 2494198 C1 | 9/2013 |
| WO | 2012041331 A1 | 4/2012 |
| WO | 2017201578 A1 | 11/2017 |

OTHER PUBLICATIONS

"Nexor Modular Cladding", Nexor, pp. 1-11, https://meditek.no/wp-content/uploads/2018/10/NEXOR-Cladding-rev.01-min.pdf, Last accessed Apr. 9, 2021.

"Stainless Steel Walls", IntegroMed, p. 1, https://www.integromed.de/en/products/wall-system/stainless-steel.html, Last accessed Apr. 9, 2021.

"Modular Room System For Operating Theatres", Infimed, pp. 1-20, http://www.infimed.pl/zdjecia/a/zal/ot-rooms-en-2020-high_202101201158.pdf, Last accessed Apr. 9, 2021.

"Modular Walls", Skytron, pp. 1-4, https://www.skytron.com/products/architectural/modular-walls/#, Last accessed Apr. 9, 2021.

"EASE Modular Systems", Skytron, pp. 1-4, https://www.skytron.com/wp-content/uploads/documentation/Modular-Walls-Brochure-WEB.pdf, Last accessed Apr. 9, 2021.

"MEDglas ™ Prefabricated OR Walls", Steris, pp. 1-7, https://www.steris.com/healthcare/products/or-environment/medglas-prefabricated-or-walls, Last accessed Apr. 9, 2021.

"Stainless steel modular walls", Vistamedikal, pp. 1-5, http://hospital-tech.com/solutions/stainless-steel-modular-walls/, Last accessed Apr. 9, 2021.

"Modular Wall System", Axis medical construction, pp. 1-4, https://www.axismedical.gr/modular-wall-system/, Last accessed Apr. 9, 2021.

"WPS-12 Stainless Steel Wall Covering", ProTek Systems Inc, pp. 1-6, https://www.proteksystem.com/product/wps-12-stainless-steel-wall-system/, Last accesed Apr. 9, 2021.

"Modular Operation Theater", Creative Health Tech Pvt. Ltd., pp. 1-5, https://www.creativemodularot.co.in/modular-operationtheater.html, Last accessed Apr. 9, 2021.

"Walling for healthcare", Altro, pp. 1-4, https://www.altro-me.com/Walls-and-doors/Sector/Healthcare, Last accessed Apr. 9, 2021.

"Drywall Handbook", Gyproc Saint-Gobain, pp. 1-44, https://www.gyproc.in/pdf/Drywall-Handbook.pdf, Last accessed Apr. 9, 2021.

Major, Maciej et al., "Effect of Steel Framing for Securing Drywall Panels On Thermal and Humidity Parameters of the Outer Walls", De Gruyter Open, vol. 13, Issue Feb. 2017, pp. 86-91, https://sciendo.com/article/10.1515/cee-2017-0011, Last accessed Apr. 9, 2021.

"Modular wall, door and ceiling system", Medifa, pp. 1-13, https://www.medifa.com/modular-room-systems/?lang=en, Last accessed Apr. 9, 2021.

Crandall, Brianna, "Metl-Span white paper lists benefits of insulated metal panels", FMLink, Jan. 18, 2016, pp. 1-3, https://www.fmlink.com/articles/metl-span-white-paper-lists-benefits-of-insulated-metal-panels/, Last accessed Apr. 9, 2021.

"Walls and ceiling panel system", Infimed, http://www.infimed.pl/en/walls-and-ceiling-panel-system,25.html, Last accessed Apr. 9, 2021.

Song, Jin-Hee et al., "Evaluation of alternatives for reducing thermal bridges in metal panel curtain wall systems", Elsevier, Energy and Buildings 127, 2016, pp. 138-158, https://www.researchgate.net/publication/303534203_Evaluation_of_Alternatives_for_Reducing_Thermal_Bridges_in_Metal_Panel_Curtain_Wall_Systems, Last accessed Apr. 9, 2021.

"Insulated metal panels installation guide," Ceco Building Systems, pp. 1-84, https://www.cecobuildings.com/wp-content/uploads/2018/10/Insulated-Panels-Installation-Manual.pdf, Last accessed Apr. 9, 2021.

Gypsum Board Assemblies, Erie Construction Council Inc, pp. 1-124, http://www.erieconstructioncouncil.com/plan_room_documents/Div%2009.pdf, Last accessed Apr. 9, 2021.

Teal, Derrick, "Insulated metal wall and roof panels for sustainability and energy efficiency", Jul. 10, 2014, pp. 1-7, https://www.slideshare.net/DerrickTeal/insulated-metal-wall-and-roof-panels-for-sustainability-and-energy-efficiency-edc1, Last accessed Apr. 9, 2021.

(56) References Cited

OTHER PUBLICATIONS

Non-Final Office Action dated Oct. 13, 2022 for U.S. Appl. No. 17/361,398.
Non-Final Office Action dated Oct. 18, 2022 for U.S. Appl. No. 17/361,417.
Non-Final Office Action dated Aug. 5, 2022 for U.S. Appl. No. 17/098,364.
Non-Final Office Action dated Aug. 15, 2022 for U.S. Appl. No. 17/401,036.
Non-Final Office Action dated Jun. 11, 2020 for U.S. Appl. No. 16/677,449.
Final Office Action dated Oct. 27, 2020 for U.S. Appl. No. 16/677,449.
Non-Final Office Action dated Mar. 19, 2021 for U.S. Appl. No. 16/677,449.
Final Office Action dated May 14, 2021 for U.S. Appl. No. 16/677,449.
Invitation to Pay Additional Fees dated Feb. 2, 2022 for Application No. PCT/US2021/055476.
International Search Report and Written Opinon dated May 23, 2022 for Application No. PCT/US2021/055476.

* cited by examiner

MODULAR WALL UNITS HAVING FRONT PANELS WITH AESTHETIC DESIGNS COVERING A WINDOW FOR MODULAR WALL SYSTEMS

BACKGROUND

Field

Aspects of the present disclosure relate to modular wall systems, modular wall units, and methods of installing modular wall systems for indoor environments such as medical treatment environments.

Description of the Related Art

Conventional modular wall systems may not be suitable for different aesthetic designs and may also not be aesthetically pleasing. Moreover, modular wall systems can be susceptible to wear and tear, such as scratches and dents. It can also be complicated, expensive, and time-consuming to incorporate aesthetic designs into modular wall systems.

Therefore, there is a need for improved modular wall systems and methods of installation thereof.

SUMMARY

Aspects of the present disclosure relate to modular wall systems, modular wall units, and methods of installing modular wall systems for indoor environments such as medical treatment environments. In one implementation, a first outer panel and a second outer panel are spaced apart from each other to form a window, and a front panel is attached to front surfaces of the first and second outer panels. The front panel is formed of a polymeric material or a composite material, and the front panel includes an aesthetic design thereon.

In one implementation, a modular wall unit for indoor environments includes a first outer panel and a second outer panel spaced apart from the first outer panel to form a window between the first outer panel and the second outer panel. Each of the first and second outer panels is formed of a metal and includes a front face having a front surface, a back face having one or more back surfaces and a recessed back surface. The modular wall unit includes a non-metallic inner panel attached to the recessed back surfaces of the first and second outer panels, and the non-metallic inner panel includes a front surface. The modular wall unit includes a front panel attached to the front surfaces of the first and second outer panels. The front panel is formed of a polymeric material or a composite material. The front panel includes a front surface, a back surface attached to the front surfaces of the first and second outer panels to cover the window, and an aesthetic design on the front surface of the front panel.

In one implementation, a modular wall unit for indoor environments includes a non-metallic inner panel having a front surface, and a first outer panel formed of a metal. The first outer panel includes a first front wall having a front surface and a back surface, and a first side wall extending relative to the first front wall in a backward direction from the front surface of the first front wall and toward the back surface of the first front wall. The first outer panel includes a plurality of first flanges extending relative to the first side wall in a first side direction. Each of the plurality of first flanges includes one or more first fastener openings. The modular wall unit includes a second outer panel formed of the metal and spaced apart from the second outer panel to form a window between the second outer panel and the first outer panel. The second outer panel includes a second front wall having a front surface and a back surface, a second side wall extending relative to the second front wall in the backward direction, and a plurality of second flanges extending relative to the second side wall in a second side direction. Each of the plurality of second flanges includes one or more second fastener openings. The modular wall unit includes a front panel attached to the front surfaces of the first and second front walls. The front panel is formed of a polymeric material or a composite material. The front panel includes a front surface, a back surface attached to the front surfaces of the first and second front walls to cover the window, and an aesthetic design on the front surface of the front panel.

In one implementation, a method of forming a modular wall unit includes spacing a first outer panel apart from a second outer panel to form a window between the first outer panel and the second outer panel. Each of the first outer panel and the second outer panel is formed of a metal. The method includes attaching a non-metallic inner panel to a back surface of the first outer panel and a back surface of the second outer panel. The method includes attaching a back surface of a front panel to a front surface of the first outer panel and a front surface of the second outer panel, the front panel formed of a polymeric material or a composite material, the front panel comprising a front surface and an aesthetic design on the front surface of the front panel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Aspects of the present disclosure relate to modular wall systems, modular wall units, and methods of installing modular wall systems for indoor environments such as medical treatment environments. In one implementation, a first outer panel and a second outer panel are spaced apart from each other to form a window, and a front panel is attached to front surfaces of the first and second outer panels. The front panel is formed of a polymeric material or a composite material, and the front panel includes an aesthetic design thereon. Aspects described herein facilitate simply and quickly providing aesthetic designs for medical treatment environments in a modular fashion while maintaining structural integrity and hygienic properties.

Figure 1:
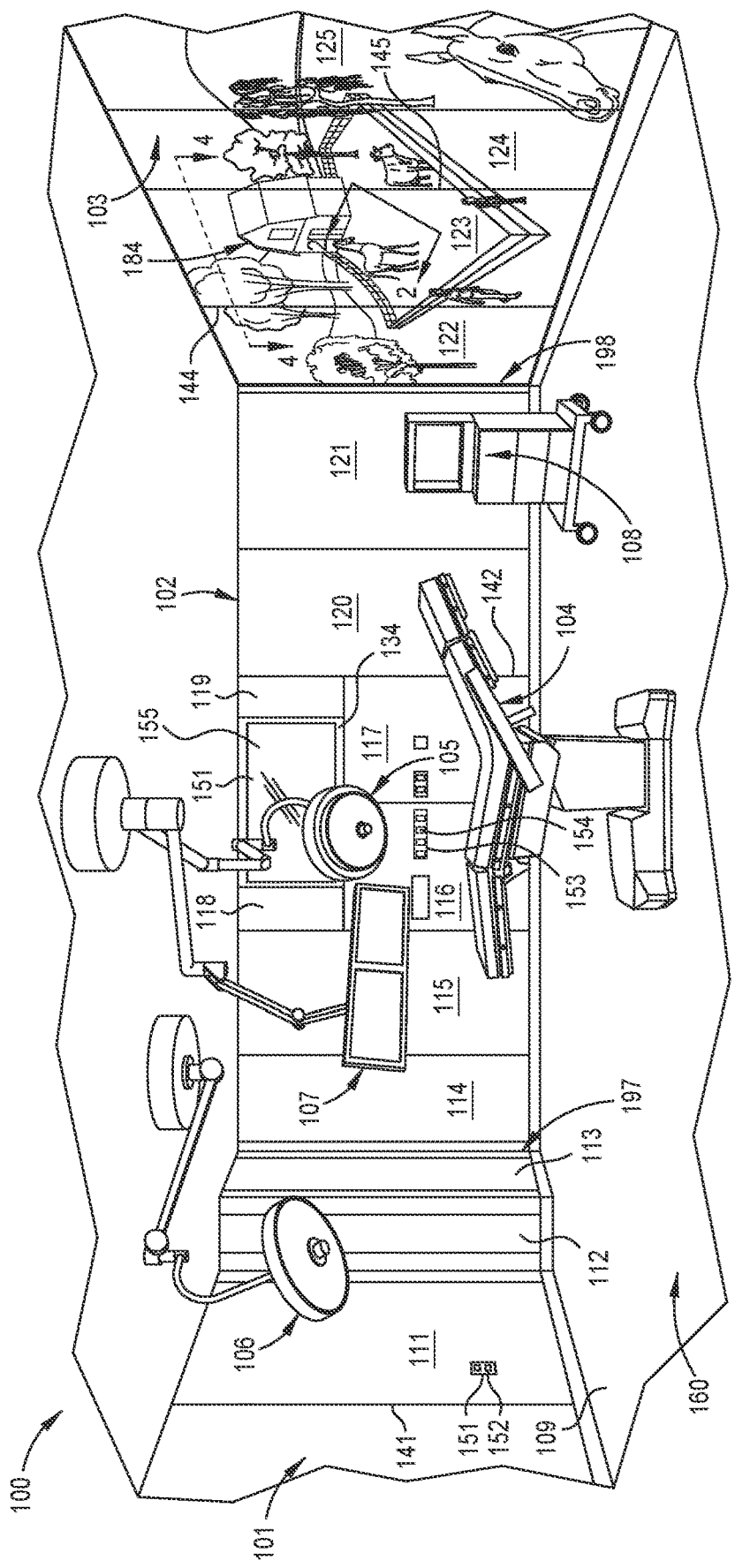
FIG. 1 is a schematic isometric view of a modular wall system installed in an indoor environment, according to one implementation.

FIG. 1 is a schematic isometric view of a modular wall system 100 installed in an indoor environment, according to one implementation. The indoor environment is a hygienic environment that is a medical treatment environment. The medical treatment environment is shown as an operating room 160 in FIG. 1. The medical treatment environment can be, for example, a sterilizing processing area. Although medical treatment environments are described herein, the present disclosure contemplates that aspects described can be used in other hygienic environments and other environments, including but not limited to public corridors and hallways, common areas, hospitals, clean rooms, pharmacies, cafeterias, radiological environments, and other environments or settings.

Three walls 101, 102, 103 of the modular wall system 100 are shown in FIG. 1. The operating room 160 includes equipment, such as medical treatment equipment, disposed therein. The equipment includes a patient chair 104, movable lights 105, 106, movable screens 107, and surgical equipment 108 disposed on a flooring material 109 of the operating room 160. The walls 101-103 include a plurality of modular wall units 111-125 arranged together as the walls 101-103. A fourth wall (or more), similar to any of walls 101-103, may also be included to define the operating room 160.

A plurality of seals 141-145 are disposed between adjacent modular wall units 111-125. The seals 141-145 can be gaskets, and can be formed of a silicone material. The seals 141-145 can include flat gaskets, caulk (such as a single line of caulk), and/or foam. In one embodiment, which can be combined with other embodiments, the caulk and/or the foam can include silicone or epoxy resin. In one embodiment, which can be combined with other embodiments, welded metal joints are used for the seals 141-145. Welded metal joints or epoxy resin can be used if certain harsh chemicals are used in the medical treatment environment. The seals 141-145 can be formed of an elastomeric material, such as rubber. The seals 141-145 can be formed of ethylene propylene diene monomer (EPDM) (M-Class) rubber and have a watertight seal. The watertight seal can make the seams of the seals 141-145 monolithic. The seals 141-145 can be compression-only seals. The seals 141-145 can be pushed in manually between installed modular wall units 111-125 to create the watertight seals.

One or more openings are formed in one or more of the plurality of modular wall units 111-125. One or more first openings 151 are formed in a first modular wall unit 111 to receive one or more utility modules 152, such as electrical modules, therein. One or more second openings 153 are formed in a second modular wall unit 116 to receive one or more utility modules 154, such as gas supply modules. The openings may also receive control panels. An outer panel frame 134 includes an opening 155 to receive a viewing window, such as a glass viewing window, therein. The viewing window can allow viewing of a television screen 156, a white board, another room or hallway, and/or a supplies storage unit that has supplies stored therein. The modular wall system 100 can have one or more doors formed therein. For example, the doors can be used in place of one or more of the modular wall units 111-125. The doors can include flush-mounted doors and/or fully integrated solid core doors for increased infection control and durability. The doors are not only durable and easy to clean but are built to fit active spaces. The doors may be provided in both swing and slide styles.

Figure 2:
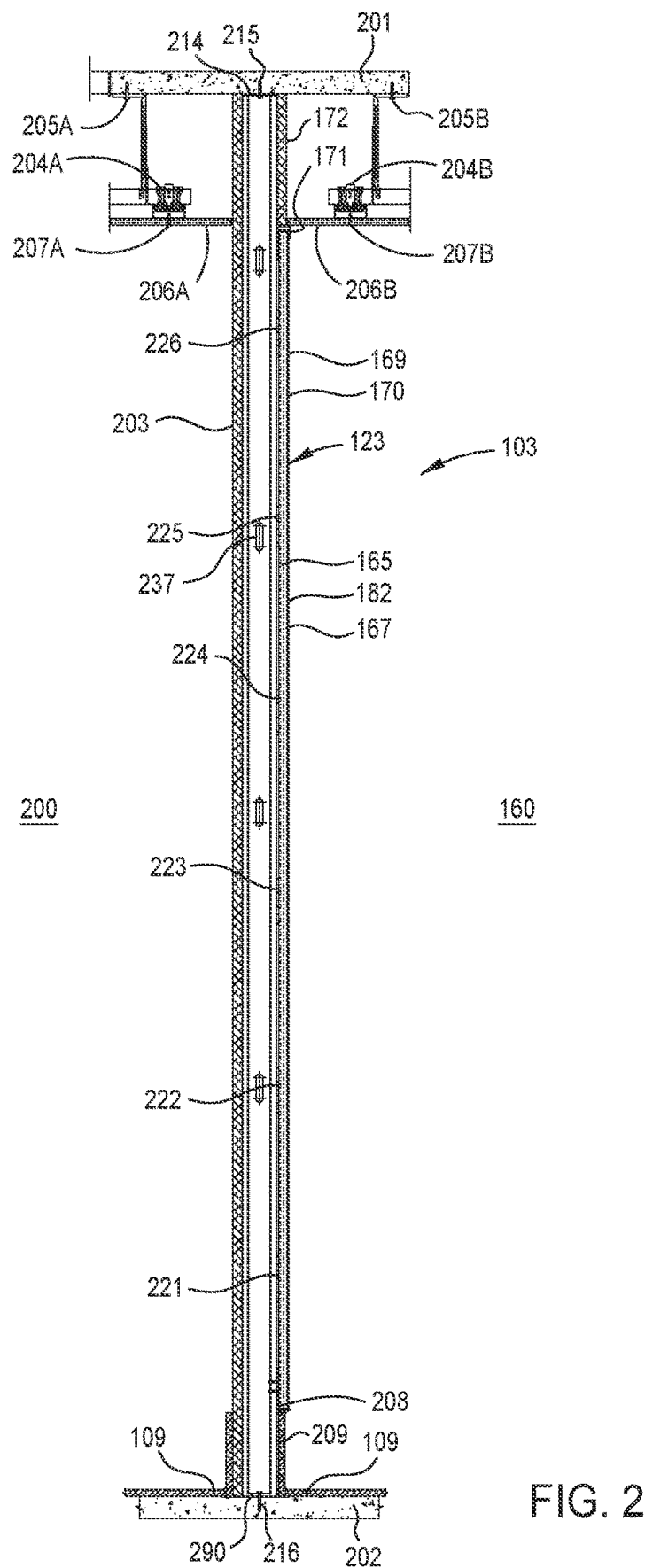
FIG. 2 is a schematic side cross-sectional view of the third wall shown in FIG. 1, along Section 2-2, with the view running parallel to the third wall, according to one implementation.

FIG. 2 is a schematic side cross-sectional view of the third wall 103 shown in FIG. 1, along Section 2-2, with the view running parallel to the third wall 103, according to one implementation. The third wall 103 separates the operating room 160 from a second area 200. The second area 200, can be for example, a second operating room, a hallway, or a patient waiting room.

A ceiling slab 201 is disposed above a floor slab 202. Each of the ceiling slab 201 and the floor slab 202 is a concrete slab. The ceiling slab 201 can be considered a floor slab for a floor above the operating room 160. The floor slab 202 can be considered a ceiling slab for a floor below the operating room 160. A first piece of drywall 203 extends between the ceiling slab 201 and the floor slab 202. A plurality of ceiling support assemblies 204A, 204B are disposed on opposing sides of the second wall 102 and the first piece of drywall 203. The ceiling support assemblies 204A, 204B are fastened to the ceiling slab 201 using fasteners 205A, 205B. The ceiling support assemblies 204A, 204B define a ceiling profile for the second wall 102. A plurality of ceiling panels 206A, 206B are fastened to the respective ceiling support assemblies 204A, 204B using fasteners 207A, 207B. Lower flanges 290 of the studs 213 are fastened to the floor slab 202 using a plurality of fasteners 216. One or more base frames 208 are fastened to the studs 213 and define a floor profile for the second wall 102. A single base frame 208 is shown in FIG. 2.

Terms such as "fasten(s)," "fastener(s)," "fastened," and "fastening," may include use of bolts, nuts, studs, clamps, threaded connections, screws, and/or other fasteners. Terms such as "fasten(s)," "fastener(s)," "fastened," and "fastening," may include use of interference fitting, such as friction interference fitting, guide and slot interference fitting, and/or dovetail interference fitting. Terms such as "fasten(s)," "fastener(s)," "fastened," and "fastening," may include direct fastening and/or indirect fastening.

A lower backplate 209 is fastened to the studs 213. The lower backplate 209 is formed of a wood material, such as a solid wood, engineered wood, or medium-density or high-density fiberboard. The flooring material 109 is formed on the floor slab 202 and an inner face of the lower backplate 209. A plurality of studs 213 are disposed between the first piece of drywall 203 and the second wall 102. The studs 213 are formed of a metal, such as stainless steel or aluminum (or an alloy thereof). The studs 213 are fastened to the ceiling slab 201 using a plurality of upper flanges 214 of the studs 213. The upper flanges 214 are fastened to the ceiling slab 201 using fasteners 215. The studs 213 have a plurality of openings 237 formed therein. The openings 237 can be longitudinal slots. The openings 237 can be through-holes. The openings 237 can have a diameter of 4 mm, for example.

A plurality of backplates 221-226 are fastened to the studs 213. The plurality of backplates 221-226 are disposed above the lower backplate 209. A gap cover apparatus 171 and the one or more base frames 208 are formed of a metal, such as stainless steel or aluminum (or an alloy thereof). The modular wall units 122-125 (shown in FIG. 1) are arranged together as the third wall 103 and fastened to backplates 221-226 that are fastened to the studs 213. FIG. 2 shows a modular wall unit 123 as fastened to the plurality of backplates 221-226, the gap cover apparatus 171, and the one or more base frames 208, each of which are fastened to the studs 213. The modular wall unit 123 includes a non-metallic inner panel 165 and a pair of first and second outer panels 166, 196 (shown in FIG. 3) disposed adjacent edges of a front surface 167 of the non-metallic inner panel 165. The modular wall units 114-122, 124, and 125 are similarly constructed. A front panel 182 of the modular wall unit 123 is attached to the front surface 167 of the non-metallic inner panel 165.

The modular wall unit 123 is disposed at least partially in the gap cover apparatus 171. The gap cover apparatus 171 covers a ceiling corner gap disposed above the modular wall unit 123. The gap cover apparatus 171 can seal the modular wall unit 123. The gap cover apparatus 171 can be a U-shaped bracket (as shown) and/or can include one or more Z-shaped brackets. The gap cover apparatus 171 is formed of aluminum, steel, and/or an alloy thereof (such as stainless steel). A second piece of drywall 172 extends between the gap cover apparatus 171 and the ceiling slab 201. The first and second outer panels 166, 196 (shown in FIG. 3) are fastened to the studs 213. The present disclosure contemplates that a piece of drywall can be disposed between the studs 213 and the outer panels 166, 196 (shown in FIG. 3), and the outer panels 166, 196 can be fastened to the studs 213 through the piece of drywall.

Figure 3:
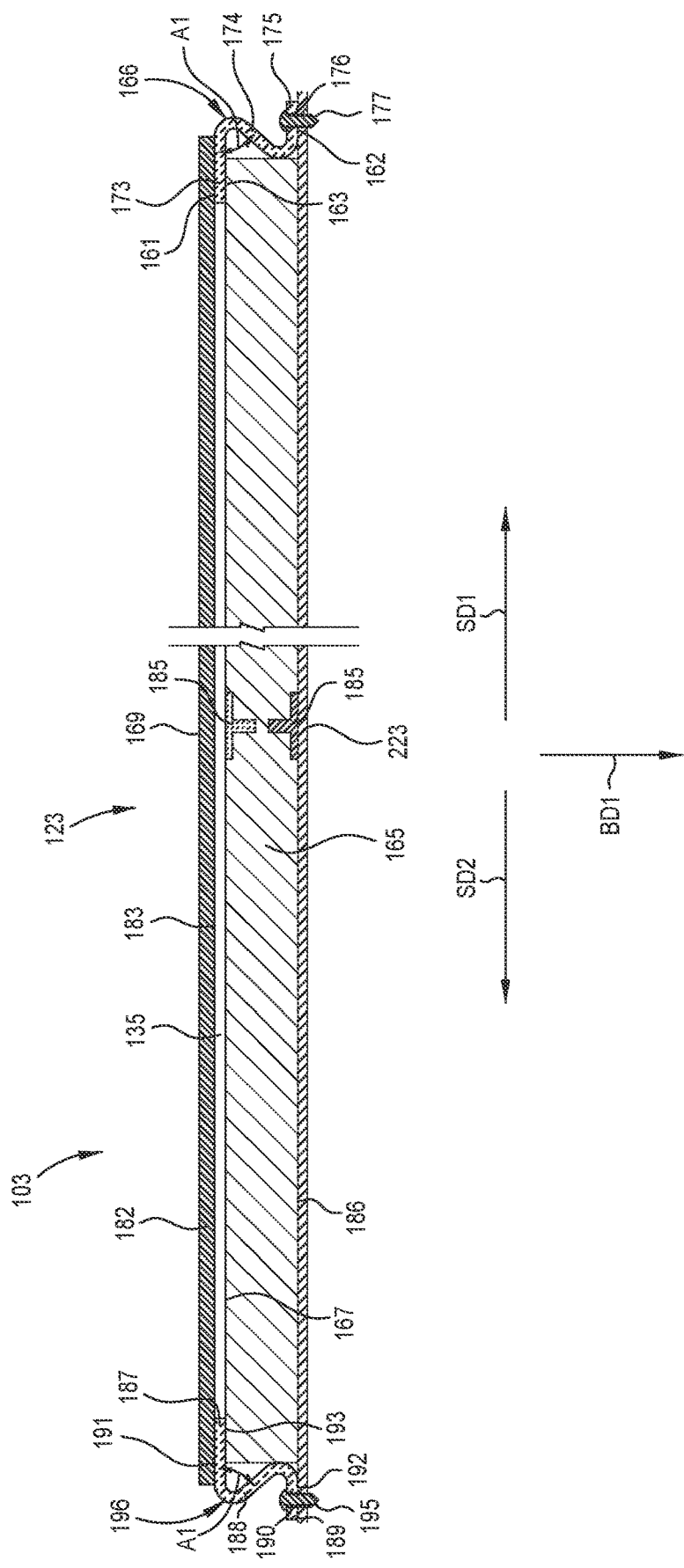
FIG. 3 is a schematic top cross-sectional view of the modular wall unit shown in FIG. 1, according to one implementation.

FIG. 3 is a schematic top cross-sectional view of the modular wall unit 123 shown in FIG. 1, according to one implementation. The modular wall unit 123 includes the first outer panel 166 and the second outer panel 196 spaced apart from the first outer panel 166 to form a window 135 between the first outer panel 166 and the second outer panel 196. Each of the first and second outer panels 166, 196 is formed of a metal, such as aluminum or stainless steel. The first outer panel 166 includes a front face having a front surface 161, and a back face having one or more back surfaces 162 and a recessed back surface 163. The second outer panel 196 includes a front face having a front surface 191, and a back face having a back surface 192 and a recessed back surface 193.

The non-metallic inner panel 165 is attached to the recessed back surfaces 163, 193 of the first and second outer panels 166, 196. The front panel 182 is attached to the front surfaces 161, 191 of the first and second outer panels 166, 196. The front panel 182 is formed of a polymeric material or a composite material. The front panel 182 includes a front surface 169 and a back surface 183 attached to the front surfaces 161, 191 of the first and second outer panels 166, 196 to cover the window 135. A portion (and not an entirety) of the back surface 183 is attached to the front surfaces 161, 191 to facilitate using the outer panels 166, 196 and the window 135. In the implementation shown in FIG. 3, two vertical sides of an outer periphery of the back surface 183 is attached to the front surfaces 161, 191. In one embodiment, which can be combined with other embodiments, less than one-third of a surface area of the back surface 183 is attached to the front surfaces 161, 191.

The window 135 and the first outer panel 166 being spaced apart from the second outer panel 196 facilitates simply and effectively providing aesthetic designs for the modular wall unit 123 while facilitating hygienic properties for the modular wall unit 123. The window 135 and the first outer panel 166 being spaced apart from the second outer panel 196 facilitates simply and cost-efficiently providing aesthetic designs for different modular wall units having a variety of sizes. The window 135 and the first outer panel 166 being spaced apart from the second outer panel 196 facilitates modularity in providing aesthetic designs for different materials and different specifications. The front panel 182 includes an aesthetic design 184 (shown in FIG. 1) on the front surface 169 of the front panel 182. In one embodiment, which can be combined with other embodiments, the front panel 182 is formed of the polymeric material, and the polymeric material includes vinyl. The vinyl includes polyvinyl chloride and/or one or more polyvinyl resins. The present disclosure contemplates that other polymeric materials can be used. In one embodiment, which can be combined with other embodiments, the front panel 182 is formed of the composite material, and the composite material includes one or more of a laminate structure (such as a laminate of paper or textile with melamine resin (e.g., Formica®) or another laminate structure) and/or a fiberglass. In one embodiment, which can be combined with other embodiments, the front panel 182 includes a wood grain and/or a particle board with a laminate structure on the front face of the wood grain and/or particle board. In one example, which can be combined with other examples, the wood grain includes a wood veneer and/or a wood grain graphic. In one embodiment, which can be combined with other embodiments, the front panel 182 is formed of glass, such as SDT tempered safety glass or laminated safety glass. The glass has a thickness within a range of 0.25 inches to 1.00 inch, such as 0.5 inches or 0.75 inches. In one embodiment, which can be combined with other embodiments, the front panel 182 is formed of switchable gdimmable glass, such as electronic shading glass (which can be referred to as switchable glass). In one embodiment, which can be combined with other embodiments, the front panel 182 is formed of plastic sheeting. In one embodiment, which can be combined with other embodiments, the front panel 182 is formed of a solid surface material, such as Corian® solid surface. In one embodiment, which can be combined with other embodiments, the front panel 182 includes a flat panel and a coating baked onto the flat panel, and the aesthetic design 184 can be part of the coating.

The modular wall unit 123 includes a vertical metal beam 185 disposed at least partially in the front surface 167 of the non-metallic inner panel 165 or a back surface 186 of the non-metallic inner panel 165. In FIG. 3 the vertical metal beam 185 is disposed in the back surface 186, and extends along the height of the back surface 186. The vertical metal beam 185 spans an entirety of the height of the non-metallic inner panel 165. The vertical metal beam 185 can be a T-shaped beam, as shown in FIG. 3. The vertical metal beam 185 can be an L-shaped beam. The vertical metal beam 185 facilitates preventing buckling or flexing of the non-metallic inner panel 165. The vertical metal beam 185 can be formed of aluminum (or an alloy thereof) or steel (or an alloy thereof). The vertical metal beam 185 can be disposed in the front surface 167 and extend along the height of the front surface 167, as shown in ghost for the vertical metal beam 185 in FIG. 3.

The first outer panel 166 includes a first front wall 173 having the front surface 161 and the recessed back surface 163, and a first side wall 174 extending relative to the first front wall 173 in a backward direction BD1 from the front surface 161 of the first front wall 173 and toward the back surface 163 of the first front wall 173. The first outer panel 166 includes a plurality of first flanges 175 extending relative to the first side wall 174 in a first side direction SD1 (e.g., parallel to the non-metallic inner panel 165). The first flanges 175 extend away from a first side of the non-metallic inner panel 165. The first flanges 175 include the one or more back surfaces 162. Each of the plurality of first flanges 175 includes one or more first fastener openings 176. A plurality of first fasteners 177 are disposed through the first fastener openings 176 to fasten the first outer panel 166 to the plurality of backplates 221-226 (one backplate 223 is shown in FIG. 3).

The second outer panel 196 includes a second front wall 187 having the front surface 191 and the recessed back surface 193, and a second side wall 188 extending relative to the second front wall 187 in the backward direction BD1. The second outer panel 196 includes a plurality of second flanges 189 extending relative to the second side wall 188 in a second side direction SD2 (e.g., parallel to the non-metallic inner panel 165). The second flanges 189 extend away from a second side of the non-metallic inner panel 165. Each of the plurality of second flanges 189 includes one or more second fastener openings 190. A plurality of second fasteners 195 are disposed through the second fastener openings 190 to fasten the second outer panel 196 to the plurality of backplates 221-226 (one backplate 223 is shown in FIG. 3). The first side direction SD1 and the second side direction SD2 are each perpendicular to the backward direction BD1. The first outer panel 166 and the second outer panel 196 are disposed on opposing sides of the non-metallic inner panel 165. The recessed back surfaces 163, 193 of the first and second front walls 173, 187 are disposed on opposing sides of the window 135.

The first side wall 174 is formed (e.g., bent) at an angle A1 relative to the first front wall 173, and the second side wall 188 is formed at the angle A1 relative to the second front wall 187. The angle A1 is an oblique angle. In one embodiment, which can be combined with other embodiments, the angle A1 is greater than 45 degrees and less than 90 degrees. The angle A1 is within a range of 65 degrees to 85 degrees. The angle A1 can be 76 degrees, for example. The first flanges 175 are formed (e.g., bent) at the angle A1 relative to the first side wall 174. The second flanges 189 are formed (e.g., bent) at the angle A relative to the second side wall 188.

The modular wall unit 123 facilitates use of aesthetic designs thereon while facilitating quick and cost-effective manufacturing and installation of the modular wall unit 123, and hygienic properties of the modular wall unit 123.

Figure 4:
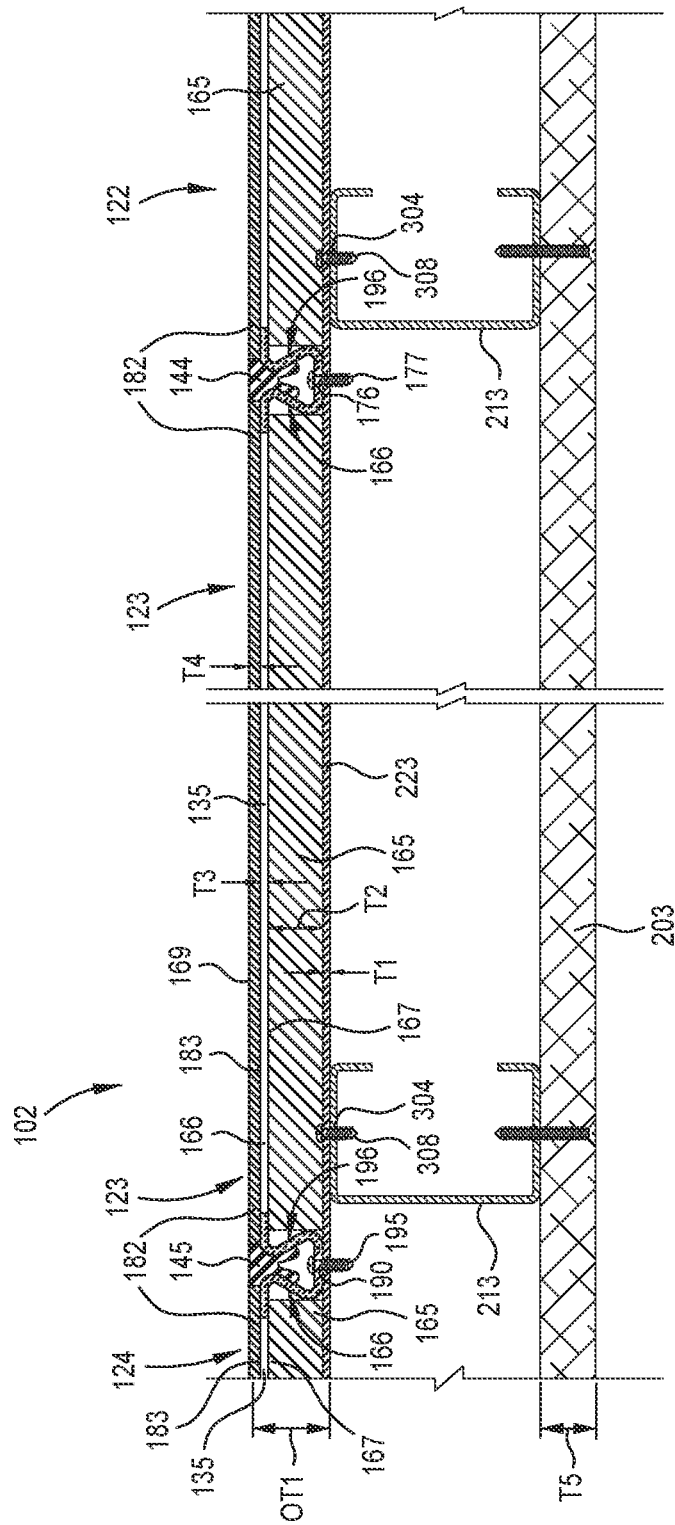
FIG. 4 is a schematic top cross-sectional view of the third wall shown in FIG. 1 and the first piece of drywall, along Section 4-4, according to one implementation.

FIG. 4 is a schematic top cross-sectional view of the third wall 103 shown in FIG. 1 and the first piece of drywall 203, along Section 4-4, according to one implementation. The outer panels 166, 196 of each of the modular wall units 122-125 is fastened to the same backplate 223 using the first fasteners 177 and the second fasteners 195. The fasteners 177, 195 can be screws, such as T-10 stainless steel screws. Other fasteners, such as bolts, nuts, and/or studs, are contemplated. Each of the modular wall units 122-125 includes an overall thickness OT1 that is ⅞ inches (22.225 mm) relative to a front face of the studs 213, including a thickness T1 of the backplate 223. The thickness T1 of the backplate 223 is within a range of 1 mm to 2 mm, such as 1 mm (0.0394 inches). The non-metallic inner panel 165 of each modular wall unit 122-125 includes a thickness T2 that is ¼ inches (6.35 mm) or ⅝ inches (15.875 mm). The outer panel 166 of each modular wall unit 122-125 includes a thickness T3 that is ⅜ inches (9.525 mm) or ¾ inches (19.05 mm). The present disclosure contemplates that the thickness T3 can be within a range of 1 mm to 2 mm. The front panel 182 of each modular wall unit 122-125 includes a thickness T4 that can be ¾ inches (19.05 mm) or less, such as ¹⁄₁₆ inches (1.5875 mm). The laminate structure (if used) of the front panel 182 includes a thickness that can be ¹⁄₁₆ inches (1.5875 mm). The first piece of drywall 203 and the second piece of drywall 172 each has a thickness T5 that is ⅝ inches (15.875 mm). The backplate 223 includes one or more fastener openings 304 configured to fasten the backplate 223 to one or more studs (two are shown in FIG. 3) of the studs 213 using one or more third fasteners 308. The present disclosure contemplates that other values may be used for the dimensions. For example, other values may be used for the thicknesses T1-T5.

Figure 5:
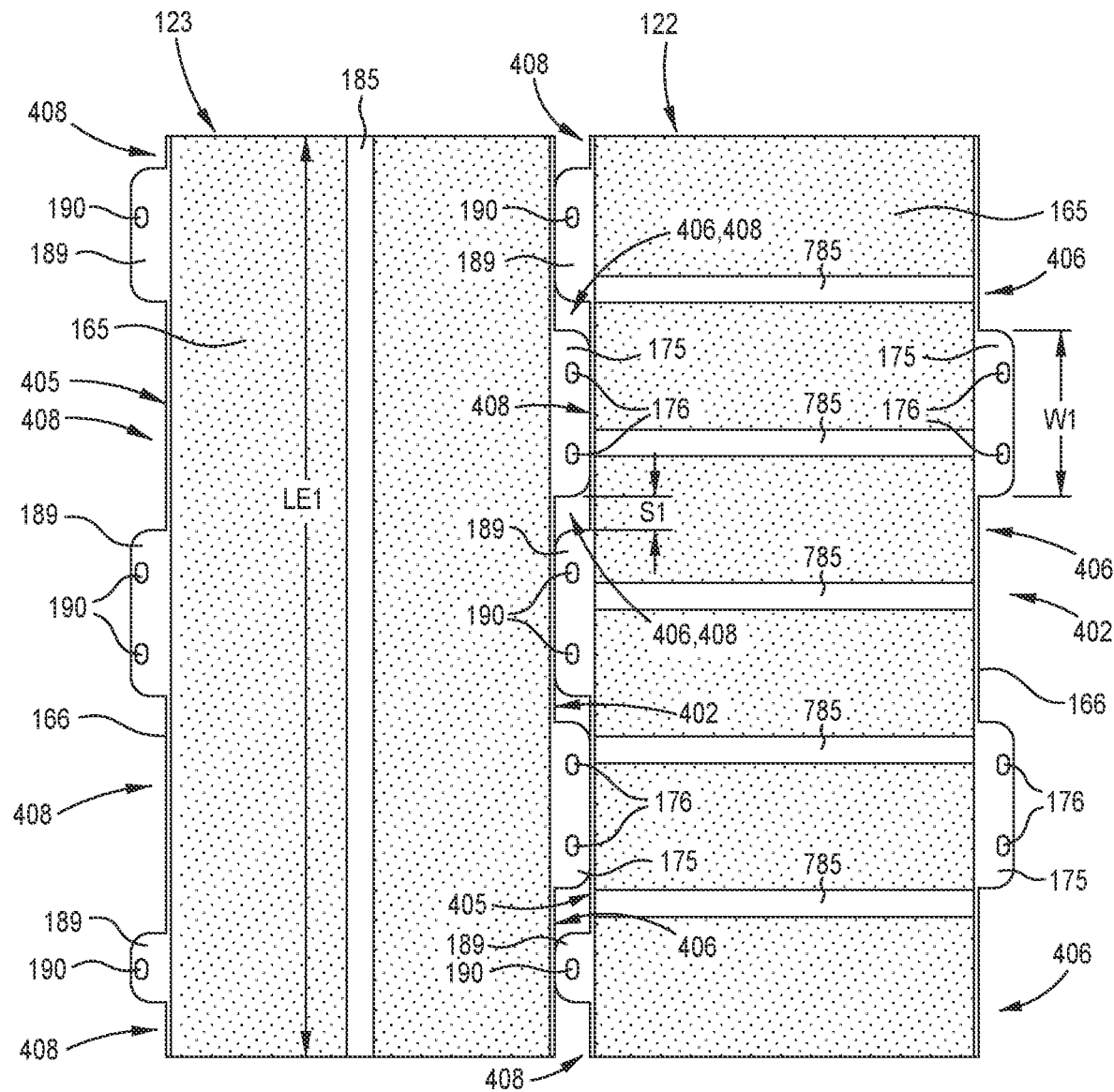
FIG. 5 is a schematic back view of the modular wall units shown in FIG. 4, according to one implementation.

FIG. 5 is a schematic back view of the modular wall units 122, 123 shown in FIG. 4, according to one implementation. The non-metallic inner panel 165 is adhered, using an adhesive, to the recessed back surfaces 163, 193 of the respective first and second outer panels 166, 196. The adhesive includes one or more hydrofluoroolefins, such as trans-1,3,3,3-Tetrafluoroprop-1-ene (HFO-1234ze), and the adhesive is water based. The adhesive is pressure sensitive. In one example, which can be combined with other examples, the adhesive is applied with a spray-gun and the adhesive dries and tacks in less than 1 minute, such as about 20 seconds. Each of the first outer panels 166 having the first flanges 175 (two are shown) is disposed on a first side 402 of the non-metallic inner panel 165 of the respective modular wall unit 122, 123.

Each of the second outer panels 196 having the second flanges 189 (three are shown) is disposed on a second side 405 of the non-metallic inner panel 165 of the respective modular wall unit 122, 123. For each modular wall unit 122, 123 the second side 405 opposes the first side 403.

The plurality of first flanges 175 are spaced from each other along a first pattern having first gaps 406. The first gaps 406 are disposed between the first flanges 175 and outside of the first flanges 175. The plurality of second flanges 189 are spaced from each other along a second pattern having second gaps 408. The second gaps 408 are disposed between the second flanges 189 and outside of the second flanges 189. The plurality of first flanges 175 are aligned with the second gaps 408 and the plurality of second flanges 189 are aligned with the first gaps 406.

The first pattern (of the first flanges 175 and the first gaps 406) is configured to interleave with the second pattern (of the second flanges 189 and the second gaps 408) in an alternating arrangement. In FIG. 5, the first pattern of the modular wall unit 123 is shown as interleaved with the second pattern of the modular wall unit 122 in the alternating arrangement. Each of the modular wall units 111-125 shown in FIG. 1 is arranged and fastened to a plurality of backplates for the respective wall 101-103 with first and second flanges 175, 189 in the alternating arrangement described for the modular wall units 122, 123 shown in FIG. 5. The interleaving and alternating arrangement is used for the modular wall units 111-125 such that each modular wall unit 111-125 is independently detachable from the respective plurality of backplates by removing the first fasteners 177 and second fasteners 195 from the first fastener openings 176 and the second fastener openings 190 of the respective modular wall unit 111-125. For example, the modular wall unit 123 can be independently detached from the backplates 221-226, the one or more base frames 208, and/or the gap cover apparatus 171 of the third wall 103 without first removing any of the other modular wall units 122 or 124, 125 of the third wall 103. The independent detachment of individual modular wall units 111-125 from the backplates 221-226 of the modular wall system 100 facilitates ease of replacement of modular wall units 111-125, and ease of maintenance for the modular wall system 100. As an example, one of the modular wall units 111-125 can be independently replaced in a time that is less than 1 hour, such as 30 minutes. The independent detachment of individual modular wall units 111-125 also facilitates ease of conducting further installation of equipment. As an example, a modular wall unit 111-125 can be replaced with a modular wall unit that has a differing window or opening to receive equipment therein.

The interleaving and alternating arrangement also facilitates a non-progressive installation of the modular wall units 111-125 as the walls 101-103. For example, the first modular wall unit need not necessarily be installed at a corner of the operating room 160. For example, the first modular wall unit installed for the third wall 103 could be the modular wall unit 123 or the modular wall unit 124 such that the modular wall unit 123 or the modular wall unit 124 is fastened to one or more of the backplates 221-226 before the other modular wall units of the third wall 103. Each of the modular wall units 123, 124 is fastened and installed at a distance from each corner of the third wall 103 (such as the corner 198 shown in FIG. 1). Non-progressive installation simplifies the installation and saves time and money compared to operations that use progressive installation.

Each of the first and second flanges 175, 189 includes a width W1. The width W1 can be 6 mm or more, for example. In one embodiment, which can be combined with other embodiments, adjacent flanges 175, 189 are spaced from each other by a spacing S1 in the interleaving and alternating arrangement. The spacing S1 can be 10 mm, for example. In one embodiment, which can be combined with other embodiments, each of the first and second fastener openings 176, 190 is a longitudinal slot having two semi-circular end sections and a rectangular middle section. A length of the rectangular middle section can be 6 mm, for example, and a radius of the two semi-circular end sections can be 1.78 mm, for example. Each first and second fastener opening 176, 190 can be positioned at a distance from all sides of the respective flange 175, 189, and the distance can be 3 mm, for example.

The first and second front walls 173, 187 of the first and second outer panels 166, 196 are each of a length to abut against the front surface 167 of the non-metallic inner panel 165 across an entire length (such as an entirety of a length LE1 of the non-metallic inner panel 165) of the respective modular wall unit 122, 123 such that the first and second outer panels 166, 196 are attached to the non-metallic inner panel 165 across the entire length.

Each non-metallic inner panel 165 is formed of drywall, such as gypsum board. The present disclosure contemplates that other moisture-resistant and mold-resistant materials can be used for the non-metallic inner panels 165, such as a fiberglass-reinforced (e.g., fiberglass-backed) drywall or a honeycomb structural material. The backplates 221-226 are each formed of a metal, such as steel, for example 16 gauge steel. The metal of the backplates 221-226 can be stainless steel or carbon steel, for example. Other gauges of steel and other materials (such as aluminum or alloys thereof) are contemplated for the backplates 221-226. The first piece of drywall 203 and the second piece of drywall 172 are each formed of drywall, such as gypsum board. The drywall referred to in the present disclosure can include Type X paneling for use on walls; can comply with ASTM C1177, C1396, C1658 and D3273; and/or can include USG Sheetrock® Brand Mold Tough Panels, Firecode X, USG Brand UltraLight Panels Mold Tough Firecode® X, and/or Georgia-Pacific ToughRock® Fireguard X Mold-Guard Gypsum Board, for example.

Figure 6:
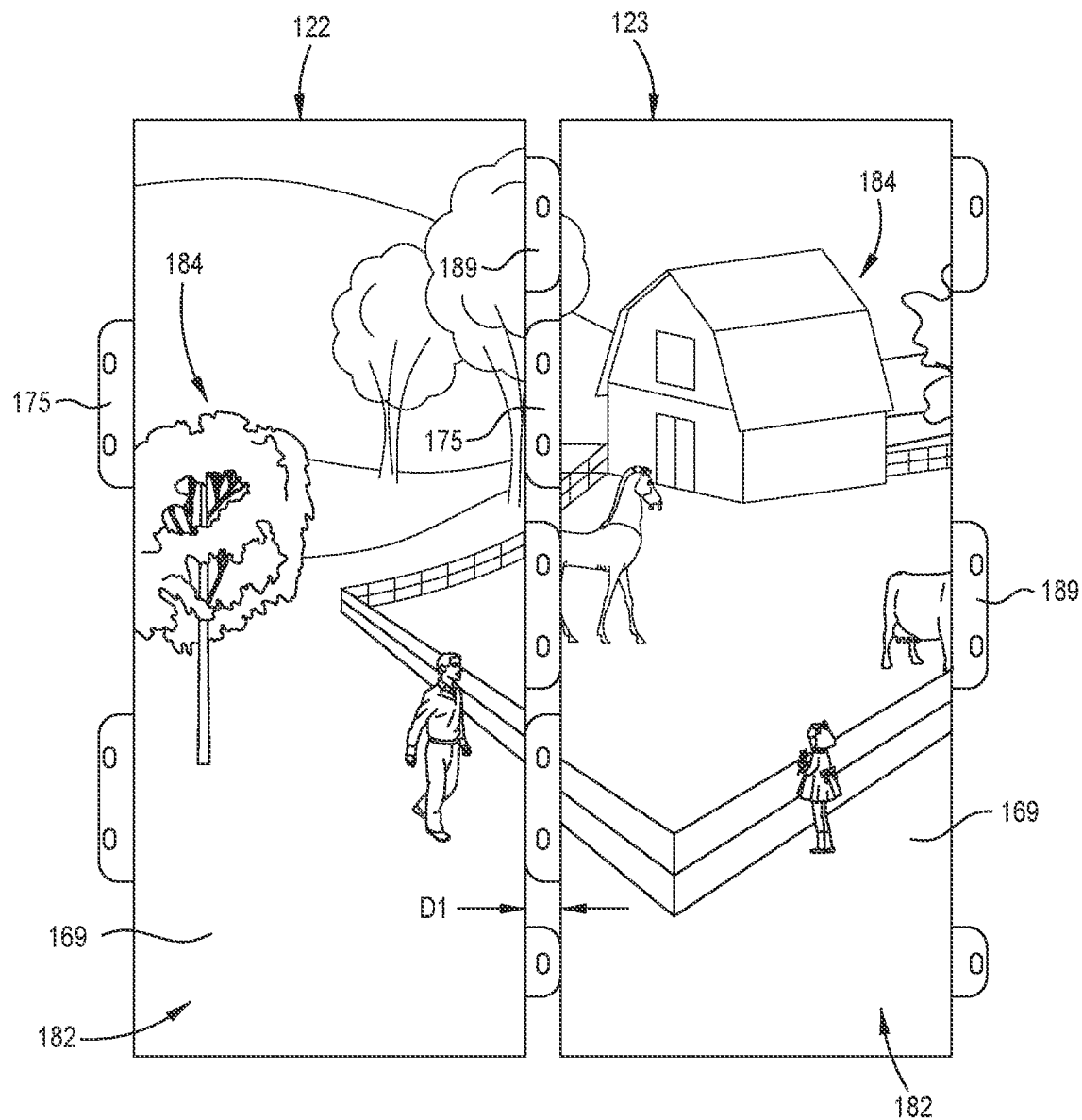
FIG. 6 is a schematic front view of the modular wall units shown in FIG. 5, according to one implementation.

FIG. 6 is a schematic front view of the modular wall units 122, 123 shown in FIG. 5, according to one implementation. The front panel 182 of each modular wall unit 122, 123 includes the aesthetic design 184 thereon. In the interleaving and alternating arrangement, adjacent outer panels 166, 196 can be disposed at a distance D1 from each other, and the distance D1 can be 6 mm, for example. In one embodiment, which can be combined with other embodiments, the aesthetic designs 184 are pre-printed on front surfaces 169 of the front panels 182. The aesthetic designs 184 are pre-printed on the front surfaces 169 prior to attaching the front panels 182 to the first and second outer panels 166, 196. In one embodiment, which can be combined with other embodiments, the aesthetic designs 184 are graphic images, as shown in FIG. 6. In one embodiment, which can be combined with other embodiments, the aesthetic designs 184 are shadings, such as dimming shadings. In one embodiment, which can be combined with other embodiments, the aesthetic designs 184 include graphical grains, such as graphical wood grains.

The front surfaces 169 facilitate hygienic properties of the operating room 160 and durability. For example, the modular wall units 111-125 can be used for several years (such as 3 years) without needing repair or replacement. As an example, the front surfaces 169 can withstand impacts that occur during medical treatment operations conducted in the operating room 160. The aesthetic designs 184 can include one or more different colors. In one embodiment, which can be combined with other embodiments, each of the front surfaces 169 has an average surface roughness that is less than an average surface roughness of the front surfaces 161, 191. A surface hardness of the front surfaces 169 is approximately 750 HV.

Each of the walls 101-103 including the modular wall units 111-125 shown in FIG. 1 has a fire rating that is 1 hour or more. As an example, the third wall 103 and the piece of drywall 203 together form a separating wall having a fire rating that is 1 hour or more. For example, the separating wall can be fire resistant against temperatures of up to 1700 degrees for at least 60 minutes. The outer panels 166, 196 and/or the front panels 182 of the modular wall units 111-125 have a Class A fire rating. The outer panels 166, 196 and/or the front panels 182 have a flame spread index that is less than 10 and a smoke-developed index that is less than or equal to 25. The outer panels 166, 196 and/or the front panels 182 can be tested in accordance with ASTM E84 for surface burning characteristics. The outer panels 166, 196 and/or the front panels 182 can have a stretcher-leveled standard of flatness.

Figure 7:
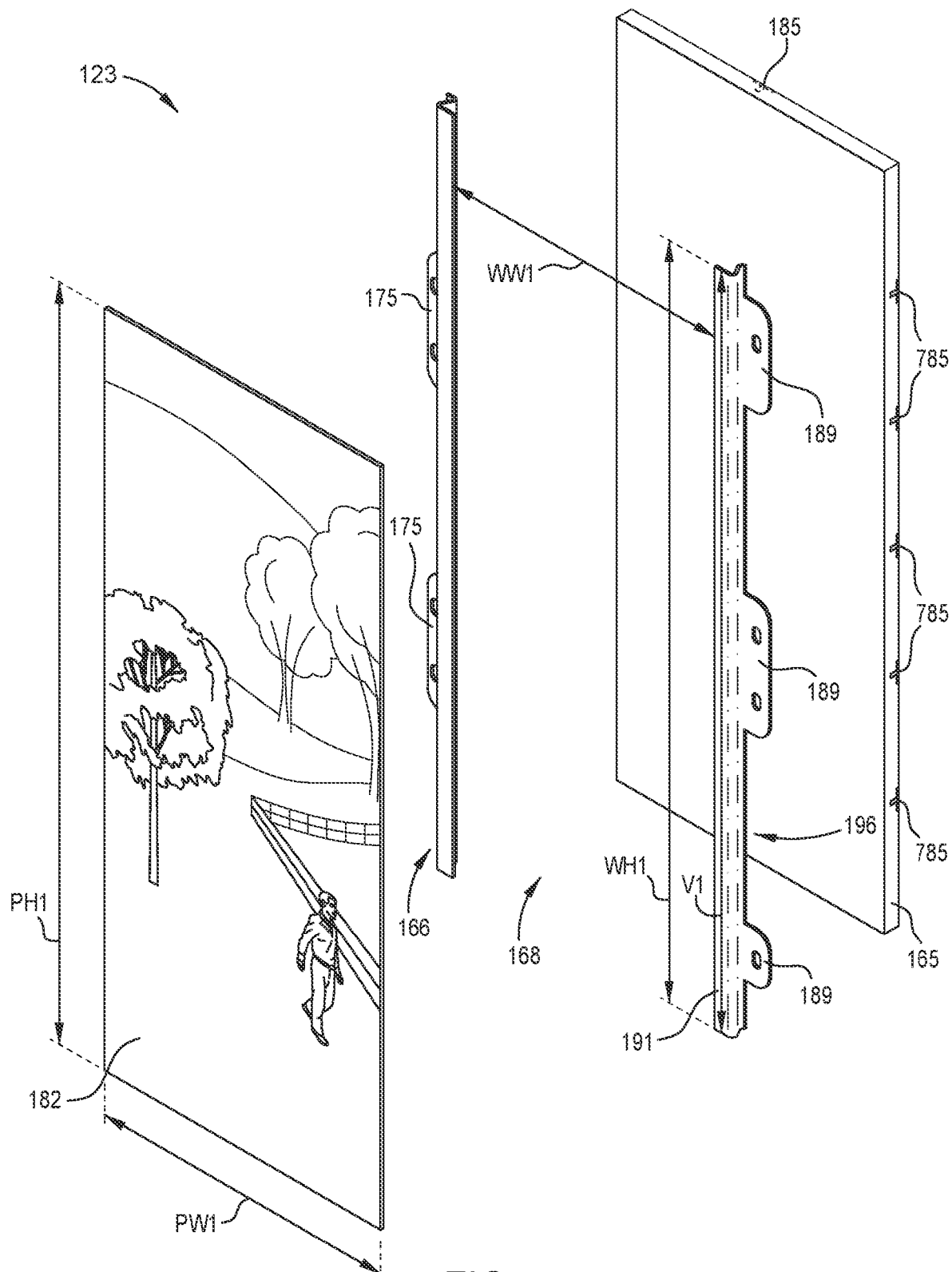
FIG. 7 is a schematic isometric exploded front view of the modular wall unit shown in FIG. 6, according to one implementation.

FIG. 7 is a schematic isometric exploded front view of the modular wall unit 122 shown in FIG. 6, according to one implementation. The second outer panel 196 is spaced apart from the first outer panel 166 to form a window 168 between the first outer panel 166 and the second outer panel 196. The front panel 182 is attached to the front surfaces 161, 191 of the first and second outer panels 166, 196 using an adhesive, and the adhesive can be the same adhesive used to attach the non-metallic inner panel 165 to the first and second outer panels 166, 196. In one or more implementations where the front panel 182 is formed of dimming glass and/or dimmable glass, the adhesive used for the front panel 182 is a second adhesive that includes silicone, such as a silicone rubber sealant. In one example, which can be combined with other examples, the second adhesive includes a material meeting the ASTM C920, Class 50 standard. In one example, which can be combined with other examples, the second adhesive includes one or more polyurethanes, and/or the second adhesive can meet one or more of technical standards AFG-01, ASTM D-3498, and/or ASTM C-557.

The front panel 182 includes a panel width PW1 and a panel height PH1 that are each larger than the thickness T4 (shown in FIG. 4) of the front panel 182. In one embodiment, which can be combined with other embodiments, the panel width PW1 is 4 feet. In one embodiment, which can be combined with other embodiments, the panel height PH1 is 12 feet or less, such as 10 feet. The window 135 includes a window width WW1 and a window height WH1 that are each larger than a window depth WD1 (shown in FIG. 4) of the window 135. The panel width PW1 is larger than the window width WW1 such that the front panel 182 covers the window 135.

Each outer panel 166, 196 is formed of stainless steel. In one embodiment, which can be combined with other embodiments, each outer panel 166, 196 is formed of 304 stainless steel, such as ASTM A666 304 (304L) stainless steel. The front surfaces 161, 191 have a Level 4 vertically brushed finish for a vertical grain. The vertical grain is applied in a vertical direction V1 on the front surfaces 161, 191. The present disclosure contemplates that other materials (such as extruded aluminum) may be used for each outer panel 166, 196. In one embodiment, which can be combined with other embodiments, a powder coating and/or a galvanized finish is applied to the front surfaces 161, 191. An antimicrobial powder coating may be used. In one embodiment which can be combined with other embodiments, the antimicrobial powder coating includes one or more of silver and/or nickel. The antimicrobial powder is applied to a film thickness that is within a range of 2.0 microns to 3.5 microns. Other finishes and/or coatings are contemplated. Such aspects (such as the material and the vertical grain) of the outer panels 166, 196 facilitate hygienic properties for the modular wall unit 123.

The vertical metal beam 185 is shown in ghost in FIG. 7. The present disclosure contemplates that a plurality of vertical metal beams 185 can be disposed in the non-metallic inner panel 165, or the vertical metal beam 185 can be omitted from the non-metallic inner panel 165. In one embodiment, which can be combined with other embodiments, a plurality of horizontal metal beams 785 are disposed in a plurality of recessed formed in the front surface 167 or the back surface 186 of the non-metallic inner panel 165 (FIG. 7 shows the recessed formed in the back surface 186). The horizontal metal beams 785 are similar to the vertical metal beam 185, and include one or more of the aspects, features, components, and/or properties thereof. The horizontal metal beams 785 extend along a width of the non-metallic inner panel 165, and span an entirety of the width of the non-metallic inner panel 165. An edge of each of the horizontal metal beams 785 extends up to 70-75% of the thickness T2 of the non-metallic inner panel 165. The horizontal metal beams 785 extend through less than an entirety of the thickness T2 of the non-metallic inner panel 165. A thickness of the sections (such as the three sections of the T shape) of each of the horizontal metal beams 785 is the same value as the thickness T3 of the outer panels 166, 196.

Figure 8:
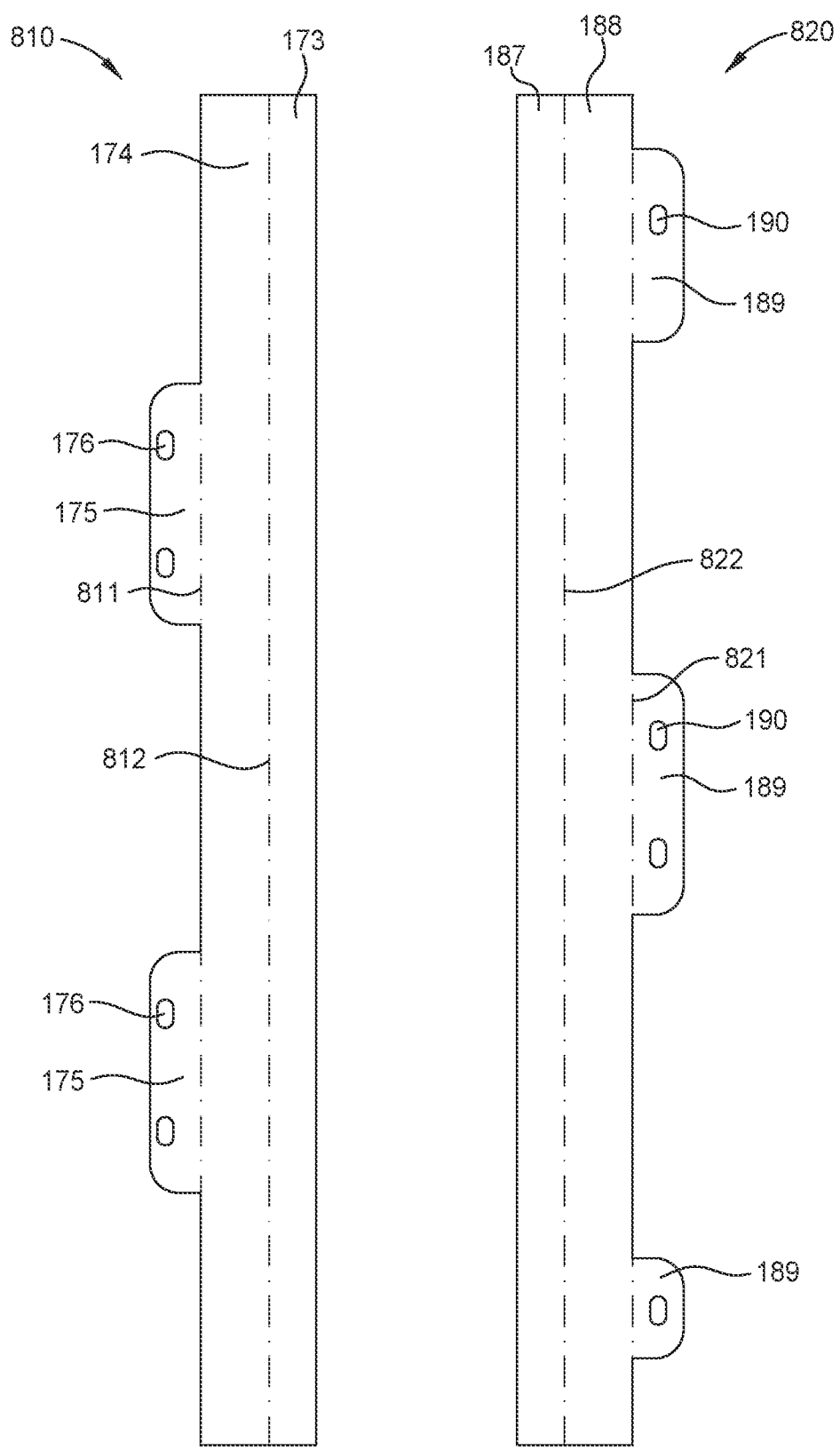
FIG. 8 is a schematic front view of a first piece of sheet metal and a second piece of sheet metal, according to one implementation.

FIG. 8 is a schematic front view of a first piece of sheet metal 810 and a second piece of sheet metal 820, according to one implementation. The pieces of sheet metal 810, 820 are shown as flat in FIG. 8. The first piece of sheet metal 810 and the second piece of sheet metal 820 each has the thickness T3 (shown in FIG. 4). The first piece of sheet metal 810 and the second piece of sheet metal 820 each has portions removed (e.g., cut out such as by using a laser cutter or a puncher) to form the first flanges 175 and the second flanges 189. A jigsaw may be used to cut out openings for in-wall devices, such as outlets. The fastener openings 176, 190 can be formed (e.g., laser cut or punched) before or after removing the portions to form the flanges 175, 189. In a method of forming the first outer panel 166, the first piece of sheet metal 810 undergoes a first bend 811 between the first flanges 175 and the first side wall 174, and a second bend 812 between the first side wall 174 and the first front wall 173. Application of the first bend 811 and the second bend 812 forms the first outer panel 166. In a method of forming the second outer panel 196, the first piece of sheet metal 820 undergoes a first bend 821 between the second flanges 189 and the second side wall 188, and a second bend 822 between the second side wall 188 and the second front wall 187. Application of the first bend 821 and the second bend 822 forms the second outer panel 196. The pieces of sheet metal 810, 820 are bent into a Z-shaped bracket to form the first outer panel 166 and the second outer panel 196.

Figure 9:
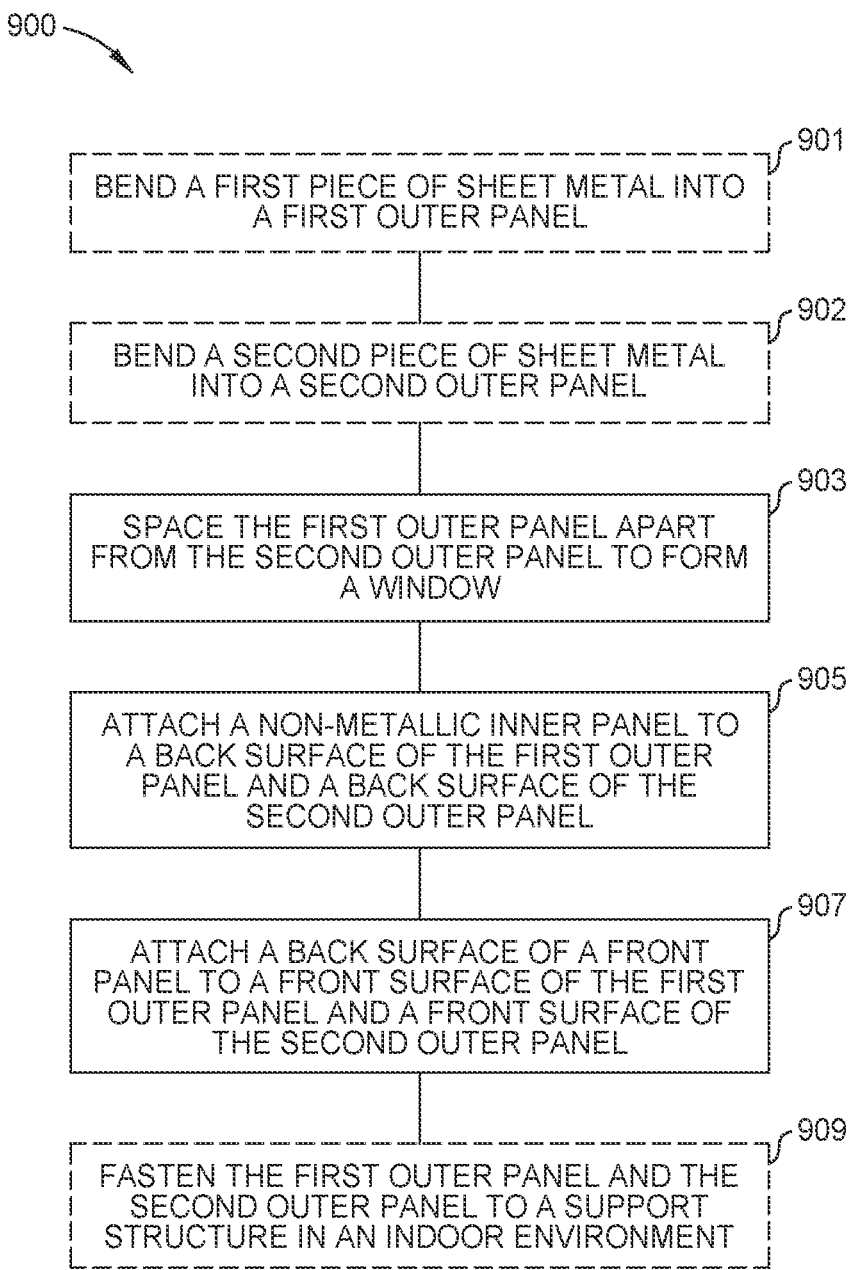
FIG. 9 is a schematic view of a method of forming a modular wall unit, according to one implementation.

FIG. 9 is a schematic view of a method 900 of forming a modular wall unit, according to one implementation. Optional operation 901 includes bending a first piece of sheet metal into a first outer panel, and optional operation 902 includes bending a second piece of sheet metal into a second outer panel. The first outer panel includes a first front wall, a first side wall extending relative to the first front wall, and a plurality of first flanges extending relative to the first side wall. Each of the plurality of first flanges includes one or more first fastener openings. The second outer panel includes a second front wall, a second side wall extending relative to the second front wall, and a plurality of second flanges extending relative to the second side wall. Each of the plurality of second flanges includes one or more second fastener openings.

Operation 903 includes spacing the first outer panel apart from the second outer panel to form a window between the first outer panel and the second outer panel. Each of the first outer panel and the second outer panel is formed of a metal.

Operation 905 includes attaching a non-metallic inner panel to a back surface of the first outer panel and a back surface of the second outer panel. In one embodiment, which can be combined with other embodiments, the method 900 includes forming (e.g., sawing) one or more recesses (such as one or more horizontal recesses and/or one or more vertical recesses) in a front surface or a back surface of the non-metallic inner panel and inserting one or more metal beams into the one or more recesses. In one example, which can be combined with other examples, the one or more recesses are formed before the attaching of operation 905.

Operation 907 includes attaching a back surface of a front panel to a front surface of the first outer panel and a front surface of the second outer panel. The front panel is formed of a polymeric material or a composite material. The front panel includes a front surface and an aesthetic design on the front surface of the front panel. In one embodiment, which can be combined with other embodiments, the aesthetic design is pre-printed on the front surface of the front panel prior to attaching the front panel to the first and second outer panels. The attaching the front panel of operation 907 covers the window formed between the first outer panel and the second outer panel.

Optional operation 909 includes fastening the first outer panel and the second outer panel to a support structure in an indoor environment. The support structure can include studs, for example. The indoor environment can be an operating room, for example. The bending of optional operation 901 and the bending of optional operation 902 can be conducted at a remote site that is remote from the indoor environment.

Figure 10:
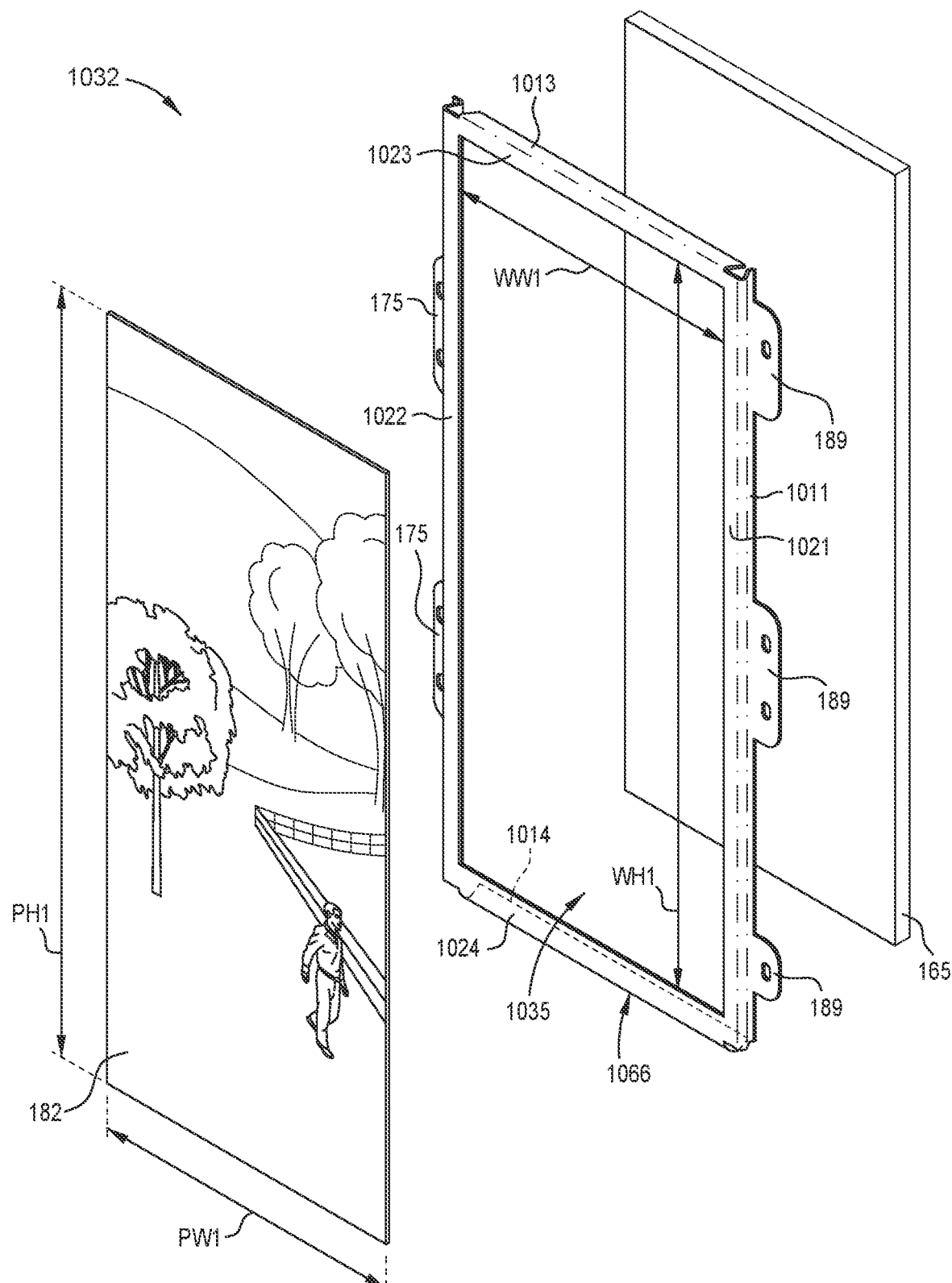
FIG. 10 is a schematic isometric exploded front view of a modular wall unit, according to one implementation

FIG. 10 is a schematic isometric exploded front view of a modular wall unit 1032, according to one implementation. The modular wall unit 1032 is similar to the modular wall unit 122 shown in FIG. 7, and includes one or more of the features, aspects, components, and/or properties thereof. The modular wall unit 1032 includes an outer panel 1066. The outer panel 1066 is a single frame that is integrally formed form a single piece of sheet metal. The outer panel 1066 is similar to the first and second outer panels 166, 196, and includes one or more of the features, aspects, components, and/or properties thereof. The modular wall unit 1032 can be used in place of one or more of the modular wall units 111-125 described above.

The outer panel 1066 includes four side walls 1011-1014 and four front walls 1021-1024. Each of the four front walls 1021-1024 includes a recessed back surface and a front surface. The front surface 167 of the non-metallic inner panel 165 is attached to the recessed back surfaces of the four front walls 1021-1024. The back surface 183 of the front panel 182 is attached to the front surfaces of the four front walls 1021-1024. A portion (and not an entirety) of the back surface 183 is attached to the front surfaces of the four front walls 1021-1024. In the implementation shown in FIG. 10, two vertical sides and two horizontal sides of an outer periphery of the back surface 183 is attached to the front surfaces of the four front walls 1021-1024. In one embodiment, which can be combined with other embodiments, less than one-half of a surface area of the back surface 183 is attached to the front surfaces of the four front walls 1021-1024. A window 1035 is defined between the four front walls 1021-1024. In the implementation shown in FIG. 10, the panel width PW1 is larger than the window width WW1, and the panel height PH1 is larger than the window height WH1 such that the front panel 182 covers the window 1035.

Figure 11:
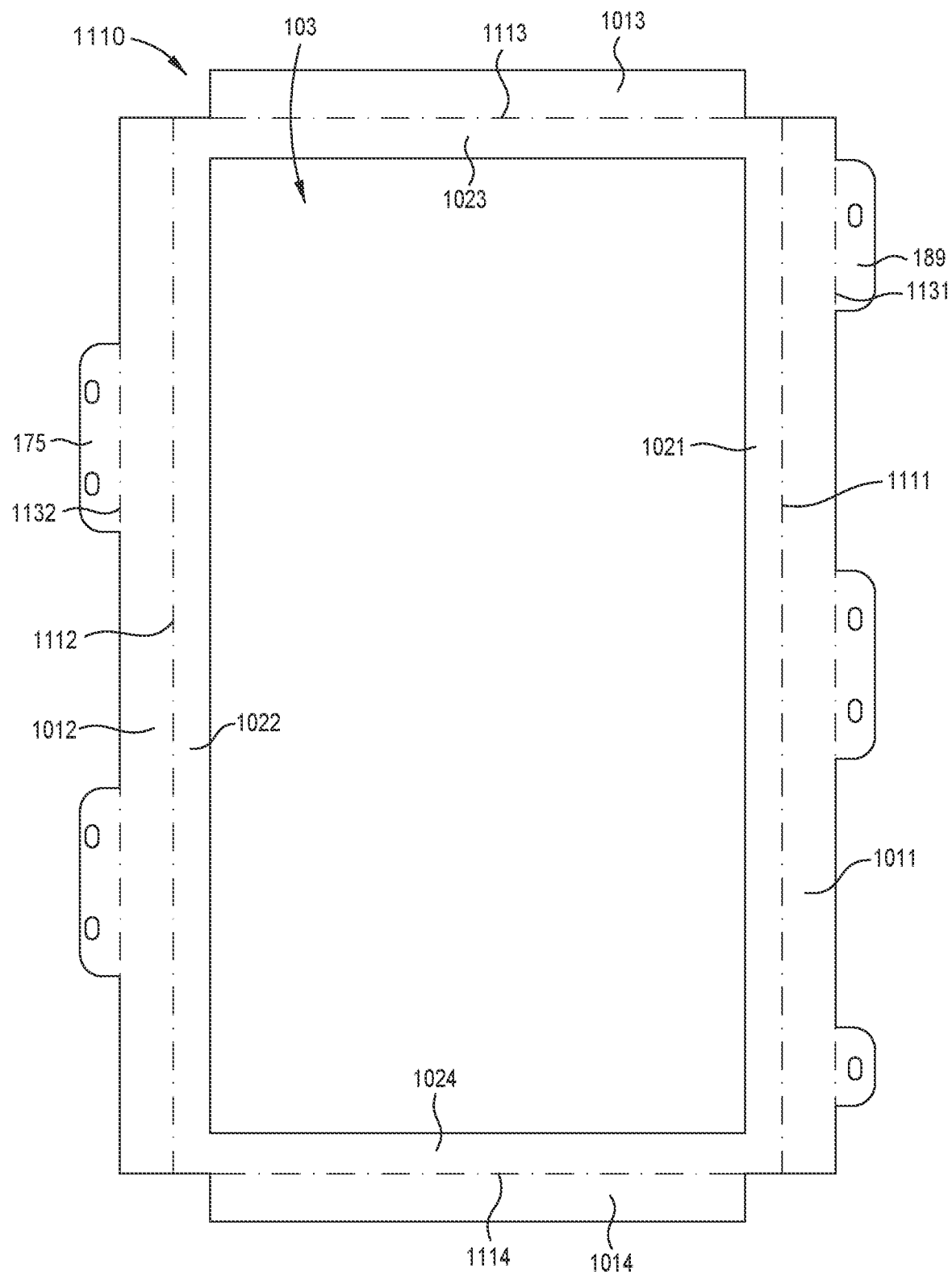
FIG. 11 is a schematic front view of a piece of sheet metal, according to one implementation.

FIG. 11 is a schematic front view of a piece of sheet metal 1110, according to one implementation. The piece of sheet metal 1110 is shown as flat in FIG. 11. The piece of sheet metal 1110 has the thickness T3 (shown in FIG. 4). The piece of sheet metal 1110 has portions removed (e.g., cut out such as by using a jigsaw) to form the first flanges 175 and the second flanges 189. The piece of sheet metal 1110 has a portion removed (e.g., cut out such as by using a laser cutter) to form the window 1035. A jigsaw may be used to cut out openings for in-wall devices, such as outlets. The fastener openings 176, 190 can be formed (e.g., laser cut) before or after removing the portions to form the flanges 175, 189. In a method of forming the outer panel 1066 shown in FIG. 10, the piece of sheet metal 1110 undergoes a plurality of bends 1111-1114 between the respective front walls 1021-1024 and the respective side walls 1011-1014. The piece of sheet metal 1110 also undergoes a bend 1131 between the side wall 1011 and the front wall 1021, and a bend 1132 between the side wall 1012 and the front wall 1022. Application of the bends 1111-1114 and the bends 1131, 1132 forms the outer panel 1066.

Benefits of the present disclosure include one or more of simply and quickly providing aesthetic designs for medical treatment environments in a modular fashion while maintaining structural integrity and hygienic properties; quick and cost-effective manufacturing and installation; enhanced hygienic properties; non-progressive installation, reduced installation time, reduced installation costs, reduced installation complexity, enhanced aesthetics, and enhanced hygiene of hygienic environments. For example, while repairing other wall systems can take days (such as 6 days), making the same repairs on the modular wall system 100 can take a time period that is 30 minutes to 4 hours (or less), which reduces or eliminates costly downtime and delays in patient care. Repairing and/or replacement of modular wall units 111-125 can be conducted outside of normal medical treatment working hours, and need not necessarily be conducted under standard ICRA containment. Components of the present disclosure (such as the modular wall units 111-125) can be formed on-site and outside of the operating room 160, or can be pre-formed and then delivered and provided at the installation site to reduce or eliminate containment procedures. Benefits of the present disclosure also include reductions in the amount of materials (such as metallic materials) used to formed modular wall units in a cost-effective and simple manner.

It is contemplated that one or more aspects disclosed herein may be combined. As an example, one or more aspects, features, components, and/or properties of the modular wall system 100, the first outer panel 166, the second outer panel 196, the outer panel 1066, and/or the method 900 may be combined. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof. The present disclosure also contemplates that one or more aspects of the embodiments described herein may be substituted in for one or more of the other aspects described. The scope of the disclosure is determined by the claims that follow.

What is claimed is:

1. A modular wall unit for indoor environments, comprising:
a first outer panel and a second outer panel spaced apart from the first outer panel to form a window between the first outer panel and the second outer panel, each of the first and second outer panels formed of a metal and comprising:
a front face comprising a front surface, and
a back face comprising one or more back surfaces and a recessed back surface, the recessed back surface and at least one of the one or more back surfaces facing away from the front surface along a backward direction;
a non-metallic inner panel attached on the recessed back surfaces of the first and second outer panels that face away from the front surfaces of the first and second outer panels, the non-metallic inner panel comprising a front surface; and a front panel attached to the front surfaces of the first and second outer panels, the front panel formed of a polymeric material or a composite material, the front panel comprising:
a front surface,
a back surface attached to the front surfaces of the first and second outer panels to cover the window, and
an aesthetic design on the front surface of the front panel.

2. The modular wall unit of claim 1, wherein the front panel is formed of the polymeric material, and the polymeric material comprises vinyl.

3. The modular wall unit of claim 1, wherein the front panel is formed of the composite material, and the composite material comprises one or more of a laminate structure or a fiberglass.

4. The modular wall unit of claim 1, further comprising one or more metal beams disposed at least partially in the front surface of the non-metallic inner panel or a back surface of the non-metallic inner panel.

5. The modular wall unit of claim 4, wherein an edge of the one or more metal beams is disposed to extend into the non-metallic inner panel by 75% or less of a thickness of the non-metallic inner panel.

6. The modular wall unit of claim 5, wherein a thickness of the one or more metal beams is a same value as a thickness of the first and second outer panels.

7. The modular wall unit of claim 1, wherein the front panel is attached to the front surfaces of the first and second outer panels using an adhesive, and the non-metallic inner panel is attached on the recessed back surfaces of the first and second outer panels using the adhesive.

8. The modular wall unit of claim 7, wherein the front panel comprises a panel width that is larger than a thickness of the front panel, the window comprises a window width that is larger than a window depth, and the panel width is larger than the window width.

9. The modular wall unit of claim 1, wherein:
the first outer panel comprises a plurality of first flanges extending relative to a first side wall of the first outer panel, the plurality of first flanges comprising one or more first fastener openings; and
the second outer panel comprises a plurality of second flanges extending relative to a second side wall of the second outer panel, the plurality of second flanges comprising one or more second fastener openings.

10. The modular wall unit of claim 9, wherein the one or more back surfaces comprise a plurality of back surfaces, the plurality of first flanges include the plurality of back surfaces of the first outer panel, and the plurality of second flanges include the plurality of back surfaces of the second outer panel.

11. The modular wall unit of claim 10, wherein the first side wall is formed at an oblique angle relative to a first front wall of the first outer panel, the first front wall including the front surface and the recessed back surface of the first outer panel, and the second side wall is formed at the oblique angle relative to a second front wall of the second outer panel, the second front wall including the front surface and the recessed back surface of the second outer panel.

12. The modular wall unit of claim 1, wherein the recessed back surfaces of the first and second outer panels are disposed on opposing sides of the window.

13. A modular wall unit for indoor environments, comprising:
a non-metallic inner panel comprising a front surface;
a first outer panel formed of a metal, the first outer panel comprising:
a first front wall comprising a front surface and a back surface, the back surface of the first front wall facing away from the front surface of the first front wall along a backward direction,
a first side wall extending relative to the first front wall in the backward direction from the front surface of the first front wall and toward the back surface of the first front wall, and
a plurality of first flanges extending relative to the first side wall in a first side direction, the plurality of first flanges comprising a plurality of back surfaces and one or more first fastener openings, at least one of the plurality of back surfaces of the plurality of first flanges facing away from the front surface of the first front wall along the backward direction;
a second outer panel formed of the metal and spaced apart from the second first outer panel to form a window between the second outer panel and the first outer panel, the second outer panel comprising:
a second front wall comprising a front surface and a back surface, the back surface of the second front wall facing away from the front surface of the second front wall along the backward direction, and the non-metallic inner panel attached on the back surfaces of the first and second front walls that face away from the front surfaces of the first and second front walls,
a second side wall extending relative to the second front wall in the backward direction, and
a plurality of second flanges extending relative to the second side wall in a second side direction, the plurality of second flanges comprising a plurality of back surfaces and one or more second fastener openings, at least one of the plurality of back surfaces of the plurality of second flanges facing away from the front surface of the second front wall along the backward direction; and
a front panel attached to the front surfaces of the first and second front walls, the front panel formed of a polymeric material or a composite material, and the front panel comprising:
a front surface,
a back surface attached to the front surfaces of the first and second front walls to cover the window, and
an aesthetic design on the front surface of the front panel.

14. The modular wall unit of claim 13, wherein each of the first side direction and the second side direction is perpendicular to the backward direction.

15. The modular wall unit of claim 14, wherein the first side wall is formed at an oblique angle relative to the first front wall, and the second side wall is formed at the oblique angle relative to the second front wall.

16. The modular wall unit of claim 13, wherein the front panel is formed of the polymeric material, and the polymeric material comprises vinyl.

17. The modular wall unit of claim 13, wherein the front panel is formed of the composite material, and the composite material comprises one or more of a laminate structure or a fiberglass.

18. The modular wall unit of claim 17, wherein the front panel comprises a panel width that is larger than a thickness of the front panel, the window comprises a window width that is larger than a window depth, and the panel width is larger than the window width.

19. The modular wall unit of claim 13, wherein the back surfaces of the first and second front walls are disposed on opposing sides of the window.

20. A modular wall unit for indoor environments, comprising:
a first outer panel and a second outer panel spaced apart from the first outer panel to form a window between the first outer panel and the second outer panel, each of the first and second outer panels formed of a metal and comprising:
 a front face comprising a front surface, and
 a back face comprising one or more back surfaces and a recessed back surface, the recessed back surface and at least one of the one or more back surfaces facing away from the front surface along a backward direction;
a non-metallic inner panel attached to the recessed back surfaces of the first and second outer panels, the non-metallic inner panel comprising a front surface;
a front panel attached to the front surfaces of the first and second outer panels, the front panel formed of a polymeric material or a composite material, the front panel comprising:
 a front surface,
 a back surface attached to the front surfaces of the first and second outer panels to cover the window, and
 an aesthetic design on the front surface of the front panel; and
one or more metal beams extending at least partially into the non-metallic inner panel.

21. The modular wall unit of claim 20, wherein an edge of the one or more metal beams is disposed to extend into the non-metallic inner panel by 75% or less of a thickness of the non-metallic inner panel.

22. The modular wall unit of claim 21, wherein a thickness of the one or more metal beams is a same value as a thickness of the first and second outer panels.

23. The modular wall unit of claim 20, wherein the one or more metal beams extend at least partially into the front surface of the non-metallic inner panel or a back surface of the non-metallic inner panel.

* * * * *